May 20, 1952      G. G. JORIS      2,597,497
PURIFICATION OF CRUDE PHENOL-ACETONE MIXTURES
Filed July 19, 1949
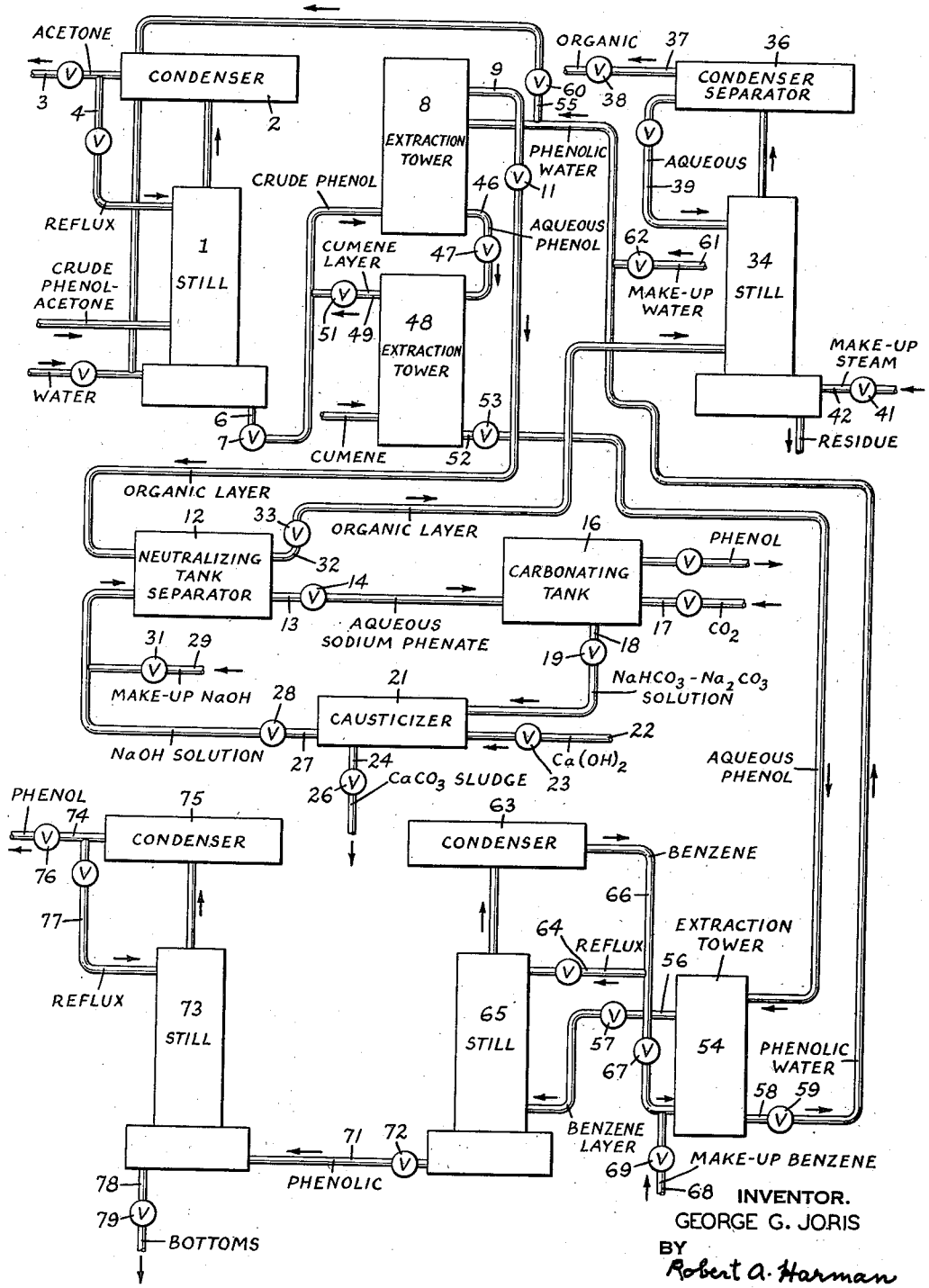
INVENTOR.
GEORGE G. JORIS
BY
Robert A. Harman
ATTORNEY.

UNITED STATES PATENT OFFICE 2,597,497

PURIFICATION OF CRUDE PHENOL-ACETONE MIXTURES

George G. Joris, Convent, N. J., assignor to Allied Chemical & Dye Corporation, New York, N. Y., a corporation of New York Application July 19, 1949, Serial No. 105,650

3 Claims. (Cl. 260—593)

This invention relates to purification of crude mixtures of acetone and phenol, in particular mixtures obtained by decomposition of cumene hydroperoxide.

The principal objects of the invention are to obtain acetone and phenol in commercially pure form, with minimum losses. Other objects and advantages will appear hereinafter.

I have found that acetone and phenol may be separated in commercially pure form from mixtures containing them by a process which comprises a distillation in the presence of water in which distillation acetone comes off overhead; water extraction of the residue, diluted with aromatic hydrocarbon, at elevated temperatures, with formation of an organic layer and an aqueous phenol layer; neutralization of the phenol in the organic layer thus produced and separation of aqueous phenol salt solution from said organic layer; extraction of the previously mentioned aqueous phenol layer with an aromatic solvent removing non-phenolic organic impurities therefrom; extraction of thus purified aqueous phenol with hydrocarbon solvent; and distillation of organic extract thus resulting, with removal of hydrocarbon solvent and separation of phenol from residue.

The accompanying drawing is a diagrammatic flow sheet illustrating one specific embodiment of my process. By way of illustration but not limitation of my invention, my process will now be described with reference to the drawing.

Separation of acetone

Into still 1 is fed neutral crude phenol-acetone mixture, obtained by decomposition of cumene hydroperoxide, and water to bring the water content of the distilland to about 10% by weight on the organic decomposition mixture introduced. Distillate is taken off overhead at about 56° C. and is condensed in condenser 2. A product stream, which is spectroscopically pure acetone, is withdrawn via line 3 and reflux is returned to the still via line 4. The overall recovery of acetone is better than 95%, and no phenol is lost during the distillation.

Use of water in this distillation step is important to assist in obtaining practically complete recovery of acetone without loss of phenol in the distillate. When a like distillation is performed in absence of water at atmospheric pressure, acetone remains in the residue even when the still temperature reaches 110°–120° C. It might be expected, since phenol and water form an azeotrope boiling at 99.5° C., that presence of water would intensify the difficulty of separating acetone and phenol; but in fact the contrary is true. Moreover use of water reduces formation of tarry residues. In part this is probably due to the fact that presence of water in the distilland keeps the still temperatures down to about 95–100° C. (the boiling point of azeotropes of water and organic residues); but in addition water appears to exert a specific inhibitory effect on tar formation. Tar formation in presence of water is remarkably less than that found in vacuum distillations at like still temperatures in absence of water.

Separation of phenol from non-phenolic aromatic organic constituents

Crude phenolic residue containing non-phenolic aromatic materials is withdrawn from still 1 via pipe 6 and valve 7 and is passed to extraction tower 8. In the extraction tower this crude phenol is countercurrently contacted with water at temperatures of about 85–90° C. The crude phenol contains a considerable proportion, suitably about 60% by weight, of an aromatic hydrocarbon diluent, e. g. unoxidized cumene present to the extent of about 50% by weight in the crude cumene hydroperoxide decomposition mixture containing phenol, acetone, and impurities.

The aromatic hydrocarbon diluent is used in this step to remove non-phenolic impurities and to promote separation of organic and aqueous layers. Principal by-products in crude cumene hydroperoxide decomposition mixtures include acetophenone and dimethyl phenyl carbinol, both of which have densities close to that of aqueous phenol. The presence of hydrocarbon diluent of lower density results in readier separation of organic layer from the aqueous phenolic layer. Use of an aromatic rather than aliphatic hydrocarbon as the diluent is important since it favors separation of the aromatic non-phenolic by-products in the organic layer and phenol in the aqueous layer. Most satisfactory results are obtained when aromatic hydrocarbon diluent is at least 30% by weight of the crude phenolic distillation residue.

Elevated temperatures, preferably at least about 85° C., contribute to more rapid phase separation. Furthermore, use of elevated rather than room temperatures results in more favorable partition coefficients of phenol in water versus phenol in the organic layer.

Recovery of non-phenolic aromatic constituents

The organic layer from extraction tower 8 is passed via line 9 and valve 11 to a neutralizing tank and separator 12. In tank 12 the organic layer is contacted with sodium hydroxide solution which extracts phenol remaining in this layer by converting the phenol to an aqueous solution of sodium phenate.

This aqueous sodium phenate is withdrawn from the bottom of tank 12 via line 13 and valve 14 and is passed to a carbonating tank 16 wherein the sodium phenate is contacted with carbon dioxide gas bubbled in via line 17. The carbon dioxide reacts with the sodium phenate to form phenol and an aqueous solution of sodium carbonate and sodium bicarbonate. The phenol layer is withdrawn and the sodium carbonate and bicarbonate solution is taken off via line 18 and valve 19 to causticizer 21.

In the causticizer sodium hydroxide solution is regenerated by action of milk of lime introduced through line 22 and valve 23. Calcium carbonate sludge is discharged from the causticizer via line 24 and valve 26. Regenerated sodium hydroxide solution is circulated via line 27 and valve 28 to neutralizing tank 12. Makeup sodium hydroxide solution of desired strength is introduced as needed via line 29 and valve 31.

The organic layer from neutralizing tank 12 is introduced via line 32 and valve 33 to still 34, wherein it is steam distilled. A water-hydrocarbon azeotrope is taken off overhead at about 95° C. and is condensed in condenser and separator 36. An organic product layer is withdrawn via line 37 and valve 38 and the aqueous layer is returned to the still via line 39. Make-up steam or water for the distillation is introduced into the still as required via line 42 and valve 41. The overhead organic products consist principally of the aromatic hydrocarbon diluent, e. g. cumene, and alpha-methyl styrene which is a by-product of cumene hydroperoxide decomposition.

The residue withdrawn from still 34 contains acetophenone and dimethyl phenyl carbinol.

*Purification of aqueous phenol*

Aqueous phenolic layer containing about 5% of phenol is withdrawn from extraction tower 8 via line 46 and valve 47. This aqueous phenol contains small amounts of dimethyl phenyl carbinol and acetophenone impurities. It is countercurrently contacted in extraction tower 48 with about 2.5% by weight of aromatic hydrocarbon solvent, most suitably cumene. The cumene removes the above-noted impurities and a small amount of phenol. The cumene layer is withdrawn from the top of extraction tower 48 and passed via line 49 and valve 51 back to extraction tower 8 for separation of the constituents thereof.

The aqueous phenolic layer is withdrawn from extraction tower 48 via line 52 and valve 53, and is introduced into extraction tower 54 for removal of phenol. In extraction tower 54 the aqueous phenol is countercurrently contacted with a hydrocarbon solvent, suitably benzene. The benzene layer, which contains about 5 or 6% by weight of phenol, is withdrawn from the top of tower 54 via line 56 and valve 57 and is passed to still 65. The aqueous layer from tower 54, containing about 1% phenol, is recirculated via line 58 and valve 59 to extraction tower 8 where, together with make-up water introduced via line 61 and valve 62, it serves as the extraction medium for separation of phenol from non-phenolic constituents of the decomposition reaction mixture. The phenolic water is likewise passed as needed via line 55 and valve 60 to still 1 to provide required water in the distilland therein.

In still 65 the hydrocarbon solvent, e. g. benzene, is distilled off; it is condensed in condenser 63. The condensate is separated into a reflux stream returning to still 65 via line 64 and a forward flow stream which is returned to extraction tower 54 via line 66 and valve 67. Make-up hydrocarbon solvent is introduced to extraction tower 54 via line 68 and valve 69.

The phenolic residue from still 65 passes via line 71 and valve 72 to still 73 wherein phenol is separated overhead. The phenol is condensed in condenser 75 and separated into a product stream, withdrawn via line 74 and valve 76, and a reflux stream returning to the still via line 77. Bottoms may be withdrawn from still 73 when desired via line 78 and valve 79. Commercially pure phenol is recovered in yields of better than 95% of the phenol originally present in the crude decomposition product.

Conventional items of equipment such as pumps, drains, surge tanks, recording and controlling instruments and so on may be used as desired to control the process above described. These and other modifications and variants of the above described embodiment of my invention will be obvious to one skilled in the art.

I claim:

1. A process for separating acetone and phenol from a cumene hydroperoxide decomposition mixture containing them which comprises distilling said mixture in presence of water and taking off acetone overhead; extracting with water at elevated temperatures of at least about 85° C. phenolic residue of said distillation which residue contains in addition to phenol at least 30% by weight of cumene, with formation of an organic layer and an aqueous phenol layer; neutralizing phenol in the organic layer thus produced and separating aqueous phenol salt solution from said organic layer; extracting from the aforementioned aqueous phenol layer, with cumene solvent, non-phenolic organic impurities therein and combining the organic layer from said extraction with the aforesaid acetone distillation residue; extracting thus purified aqueous phenol with hydrocarbon solvent; separating from organic extract, thus resulting, hydrocarbon solvent and phenol and recycling aqueous layer, from said extraction of purified phenol, for the aqueous extraction of distillation residue from the acetone distillation step and for providing water in said distillation step.

2. Process as defined in claim 1 wherein the hydrocarbon solvent for extraction of purified phenol from its aqueous solution is benzene.

3. Process as defined in claim 2 wherein a crude acetone-phenol mixture containing about 50 percent by weight of cumene is employed as starting material and the water present in the distilland of the acetone distillation step amounts to about 10 percent by weight of crude starting material introduced for distillation.

GEORGE G. JORIS.

REFERENCES CITED

The following references are of record in the file of this patent:

UNITED STATES PATENTS

| Number | Name | Date |
|---|---|---|
| 1,595,604 | Heffner et al. | Aug. 10, 1926 |
| 2,342,386 | Berger et al. | Feb. 22, 1944 |
| 2,357,252 | Berger et al. | Aug. 29, 1944 |
| 2,368,931 | Leum et al. | Feb. 6, 1945 |

FOREIGN PATENTS

| Number | Country | Date |
|---|---|---|
| 175,285 | Great Britain | July 10, 1923 |